(12) United States Patent
Hsieh

(10) Patent No.: US 9,957,014 B2
(45) Date of Patent: May 1, 2018

(54) BICYCLE PEDAL

(71) Applicant: Chin-Long Hsieh, Taichung (TW)

(72) Inventor: Chin-Long Hsieh, Taichung (TW)

( * ) Notice: Subject to any disclaimer, the term of this patent is extended or adjusted under 35 U.S.C. 154(b) by 0 days. days.

(21) Appl. No.: 15/239,846

(22) Filed: Aug. 18, 2016

(65) Prior Publication Data

US 2017/0101157 A1     Apr. 13, 2017

(30) Foreign Application Priority Data

Oct. 8, 2015 (TW) ............................. 104216228 U
Jan. 22, 2016 (TW) ............................. 105201032 U

(51) Int. Cl.
   *B62M 3/00* (2006.01)
   *B62M 3/08* (2006.01)

(52) U.S. Cl.
   CPC .................... *B62M 3/086* (2013.01)

(58) Field of Classification Search
   CPC ......... B62M 3/08; B62M 3/083; B62M 3/086
   See application file for complete search history.

(56) References Cited

U.S. PATENT DOCUMENTS

| | | | |
|---|---|---|---|
| 6,453,771 B1* | 9/2002 | Takahama | B62M 3/086 74/594.4 |
| 8,141,456 B2* | 3/2012 | Chen | B62M 3/08 74/594.6 |
| 2011/0061491 A1* | 3/2011 | Chin | B62M 3/08 74/594.4 |

FOREIGN PATENT DOCUMENTS

DE     202013004398 U1 *   5/2013    ............. B62M 3/08

* cited by examiner

*Primary Examiner* — Adam D Rogers

(57) ABSTRACT

A bicycle pedal contains: a frame, a connection seat, an engagement block, a fitting sleeve, a fixing column, and a torsion spring. The frame includes a first orifice, a second orifice, and a trench. The connection seat includes two retaining sets, a circular tube, and two troughs. The engagement block is engaged in the trench, and the fitting sleeve is fitted with the first orifice. The fixing column is connected with a bearing and a washer and is screwed with a screw nut by using a threaded section of the fixing column. The torsion spring includes a first extending segment and a second extending segment, and the engagement block includes two shoulders facing the connection seat. Furthermore, the connection seat includes multiple protrusions facing and mating with the two shoulders so as to limit a rotation of the connection seat and the two retaining sets in the frame.

9 Claims, 14 Drawing Sheets

BICYCLE PEDAL

FIELD OF THE INVENTION

The present invention relates to a bicycle pedal which contains the connection seat rotates in the frame of the bicycle pedal.

BACKGROUND OF THE INVENTION

A conventional bicycle pedal for a mountain bike contains a connection seat which has a locking set, a size of which is less than a road bike. However, the conventional bicycle pedal is complicated.

The present invention has arisen to mitigate and/or obviate the afore-described disadvantages.

SUMMARY OF THE INVENTION

The primary objective of the present invention is to provide a bicycle pedal which contains the connection seat capable of rotating in the frame of the bicycle pedal.

Another objective of the present invention is to provide a bicycle pedal which contains the connection seat and the two retaining sets, and the connection seat and the two retaining sets rotate within a predetermined range in the frame so as to lock with a fastener of a shoe quickly.

To obtain above-mentioned objectives, a bicycle pedal provided by the present invention contains: a frame, a connection seat, an engagement block, a fitting sleeve, a fixing column, and a torsion spring.

The frame includes a first orifice defined on a first outer side of the frame, a second orifice defined on a second outer side of the frame opposite to the first orifice, and a trench formed on an inner wall of the frame adjacent to the first orifice.

The connection seat is fixed in the frame and includes two retaining sets which are arranged on two end surfaces of the connection seat, respectively, a through hole defined in the connection seat, a circular tube formed on one side surface of the connection seat and accommodated in the second orifice of the frame, and two troughs formed on an outer end of the circular tube.

The engagement block is engaged in the trench of the frame.

The fitting sleeve is fitted with the first orifice of the frame.

The fixing column inserts through the fitting sleeve, the through hole of the connection seat, and the second orifice of the frame, wherein the fixing column is in connection with a bearing and a washer and is screwed with a screw nut by using a threaded section of the fixing column.

The torsion spring includes a first extending segment and a second extending segment opposite to the first extending segment, wherein the first extending segment retains in a recess of the second orifice and one of the two troughs, and the second extending segment engages in the other of the two troughs, such that the torsion spring abuts against the two retaining sets obliquely.

The engagement block further includes two shoulders facing the connection seat, and the connection seat includes a plurality of protrusions facing and mating with the two shoulders so as to limit a rotation of the connection seat and the two retaining sets within a predetermined range in the frame.

DETAILED DESCRIPTION OF THE PREFERRED EMBODIMENTS

Figure 1:
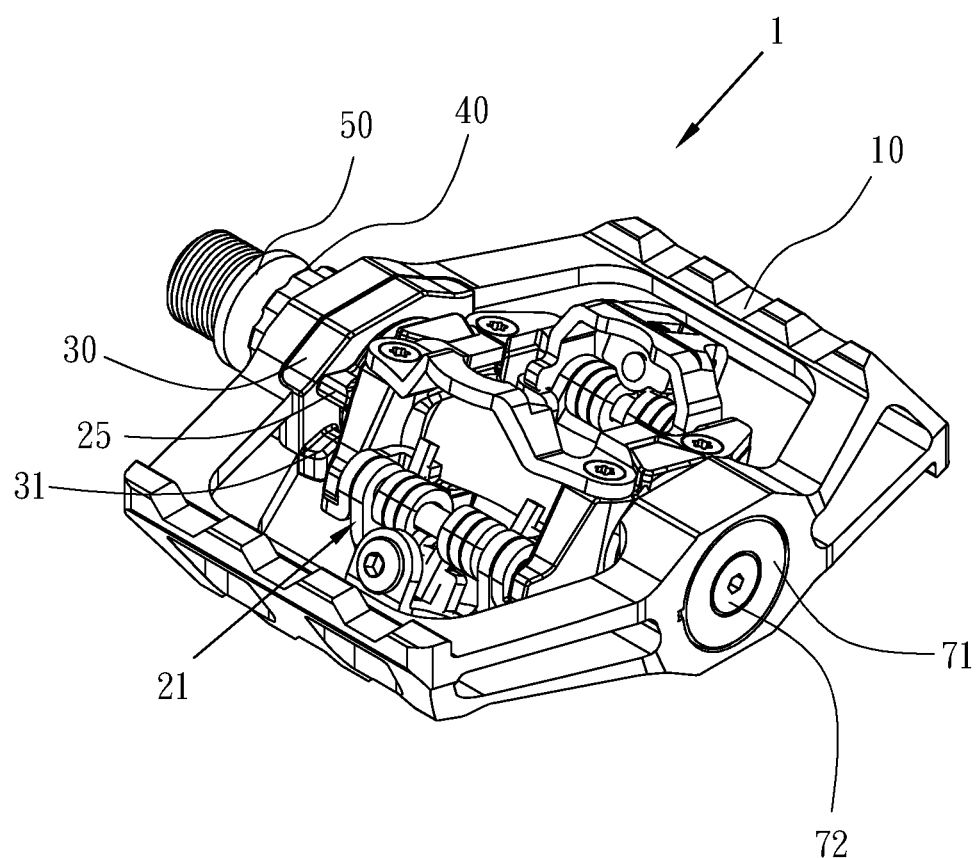
FIG. 1 is a perspective view showing the assembly of a bicycle pedal according to a first embodiment of the present invention.
Figure 2:
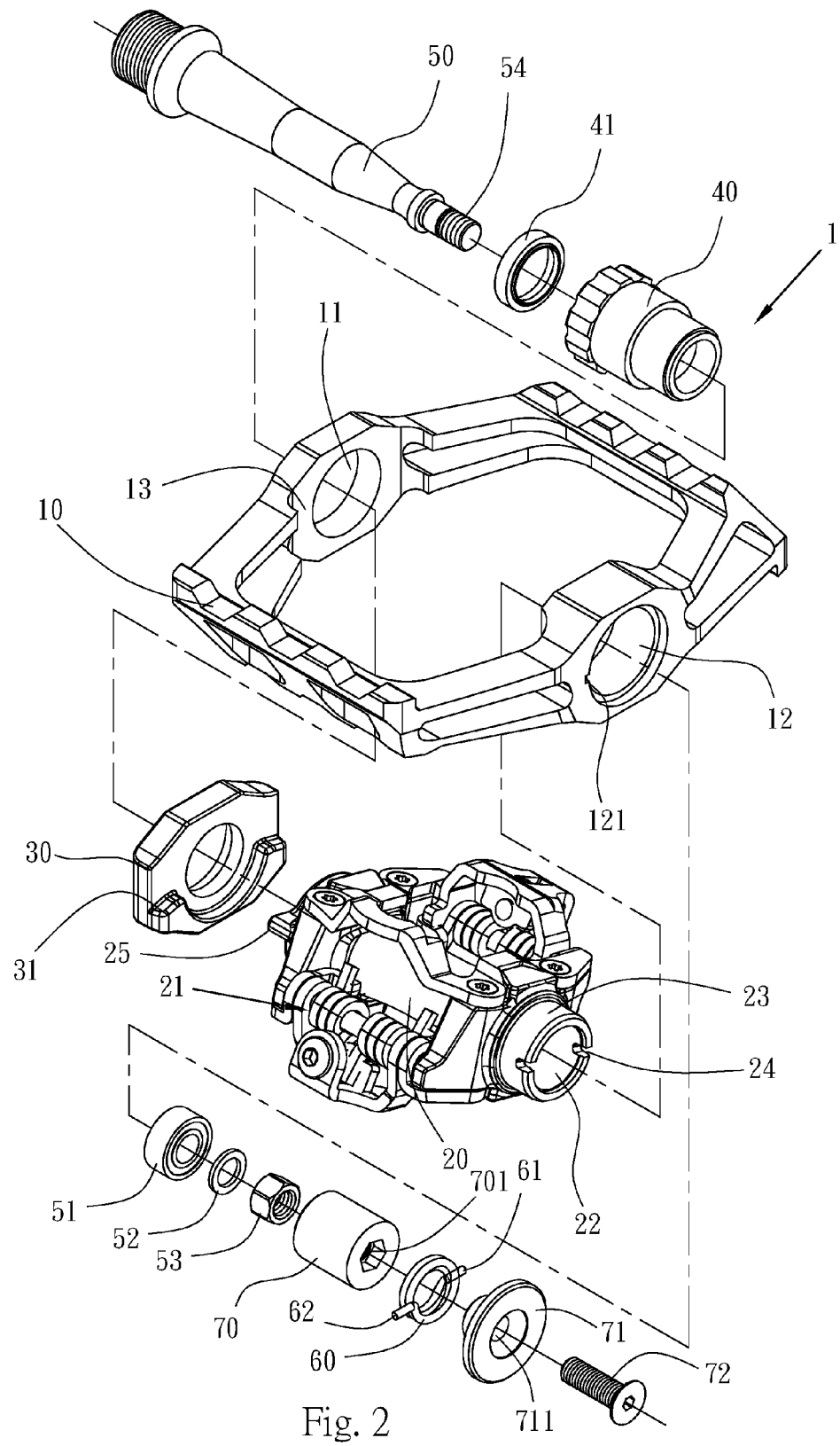
FIG. 2 is a perspective view showing the exploded components of the bicycle pedal according to the first embodiment of the present invention.
Figure 3:
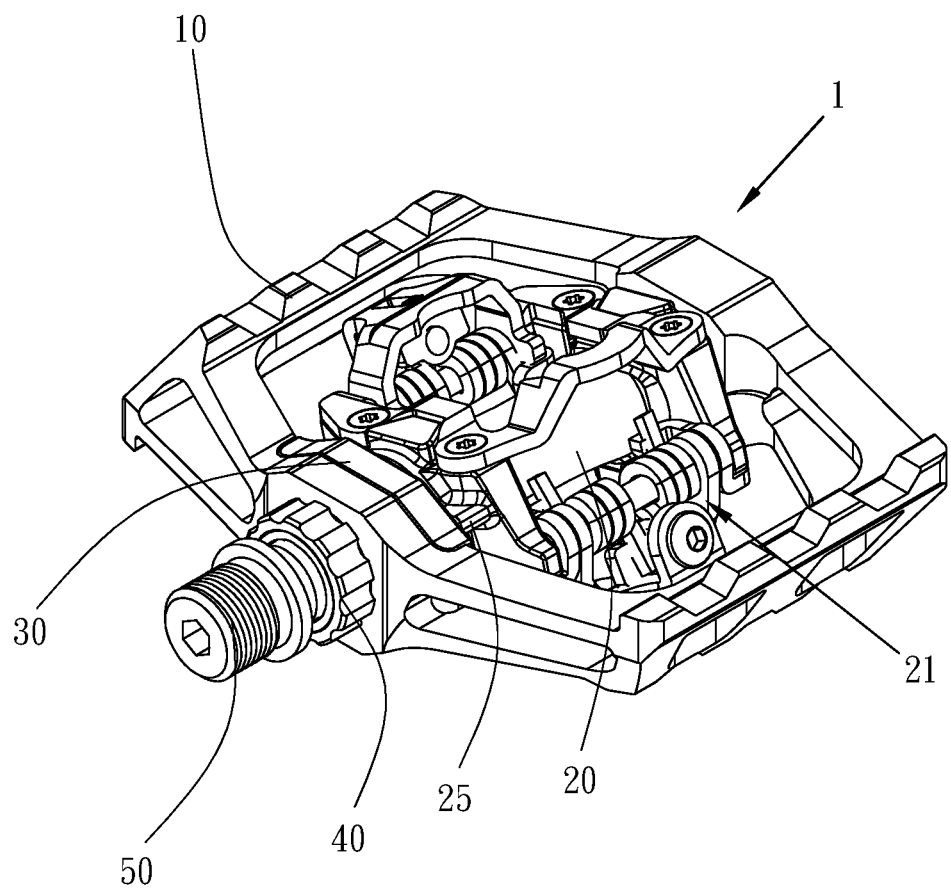
FIG. 3 is another perspective view showing the assembly of the bicycle pedal according to the first embodiment of the present invention.
Figure 4:
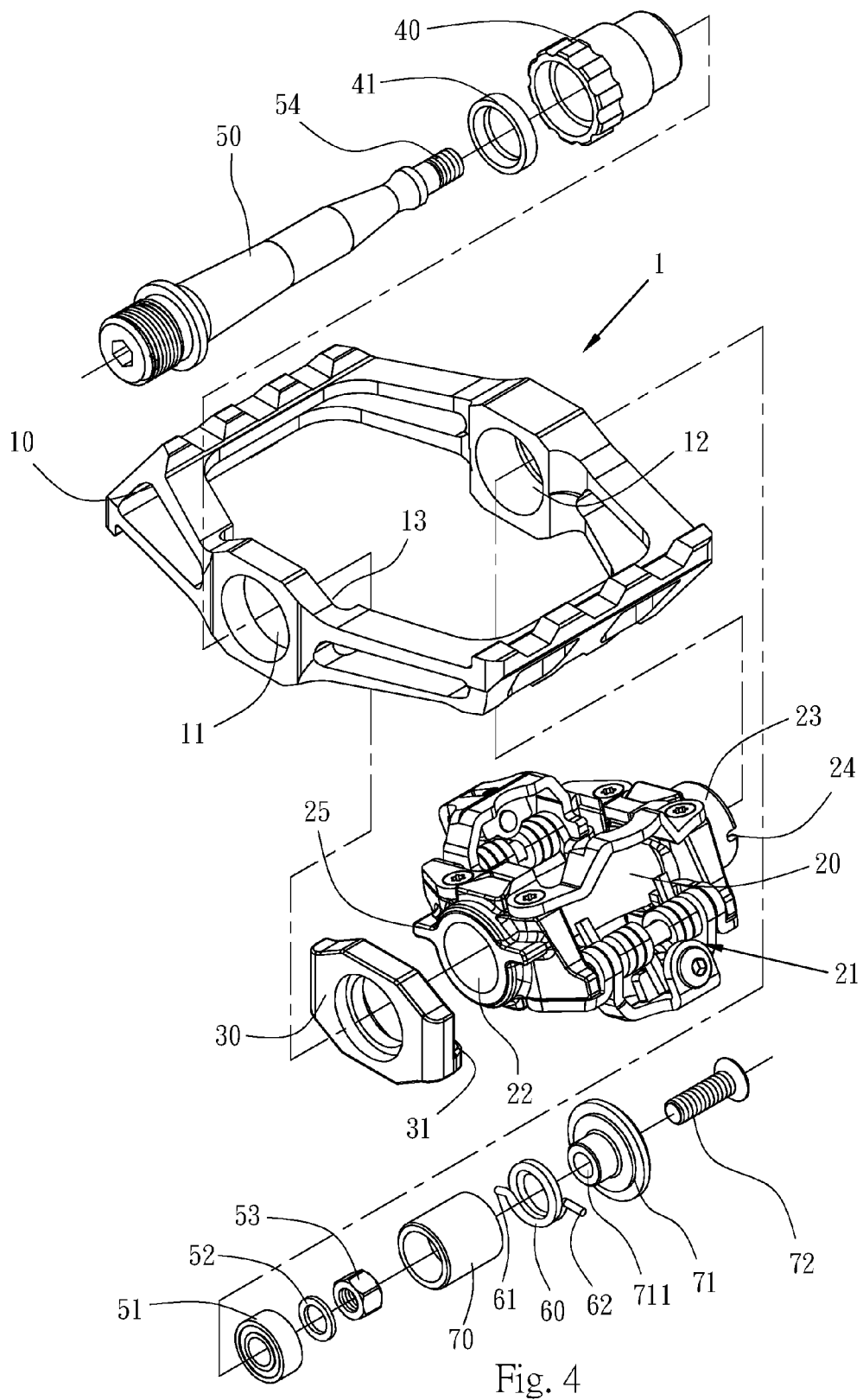
FIG. 4 is another perspective view showing the exploded components of the bicycle pedal according to the first embodiment of the present invention.
Figure 5:
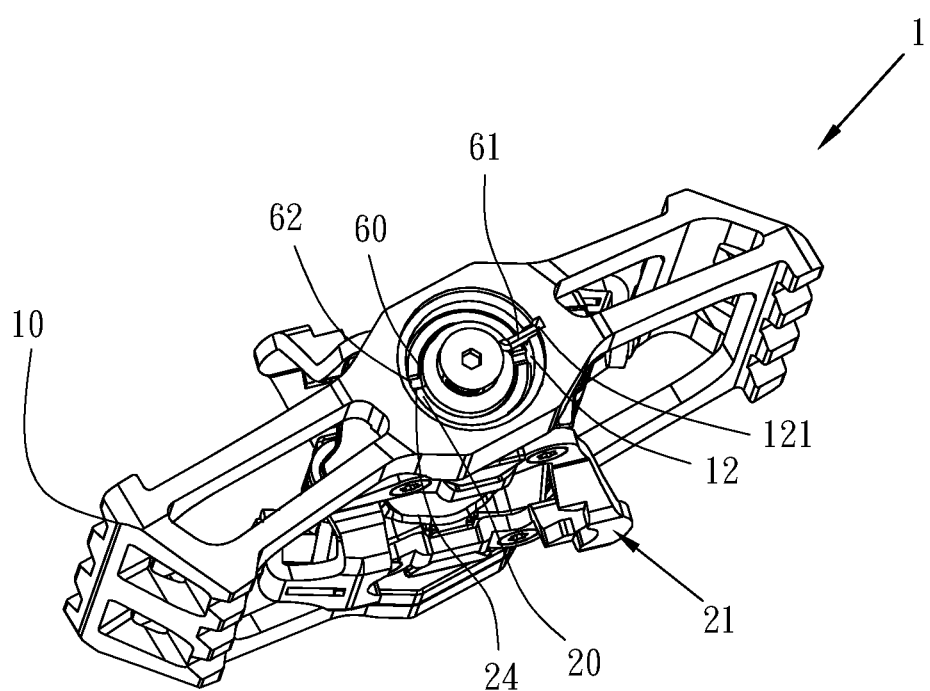
FIG. 5 is also another perspective view showing the assembly of the bicycle pedal according to the first embodiment of the present invention.
Figure 6:
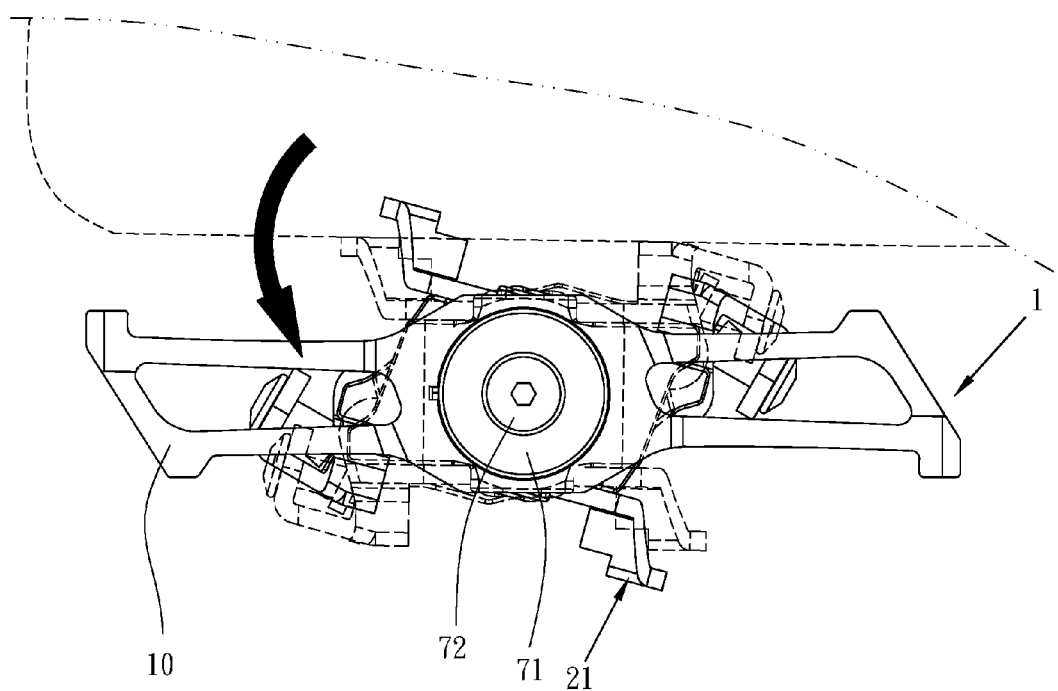
FIG. 6 is a side plane view showing the application of the bicycle pedal according to the first embodiment of the present invention.

With reference to FIGS. 1 to 6, a bicycle pedal according to a first embodiment of the present invention comprises: a frame 10, a connection seat 20, an engagement block 30, a fitting sleeve 40, a fixing column 50, a torsion spring 60, and a locking element 70.

The frame 10 includes a first orifice 11 defined on a first outer side of the frame 10, a second orifice 12 defined on a second outer side of the frame 10 opposite to the first orifice 11, and a trench 13 formed on an inner wall of the frame 10 adjacent to the first orifice 11.

The connection seat 20 includes two retaining sets 21 which are arranged on two end surfaces of the connection seat 20, respectively, a through hole 22 defined in the connection seat 20, a circular tube 23 formed on one side surface of the connection seat 20 and accommodated in the second orifice 12 of the frame 10, and two troughs 24 formed on an outer end of the circular tube 23. Furthermore, the connection seat 20 is fixed in the frame 10.

The engagement block 30 is engaged in the trench 13 of the frame 10.

The fitting sleeve 40 is fitted with the first orifice 11 of the frame 10.

The fixing column 50 inserts through the fitting sleeve 40, the through hole 22 of the connection seat 20, and the second orifice 12 of the frame 10, wherein the fixing column 50 is in connection with a bearing 51 and a washer 52 and is screwed with a screw nut 53 by using a threaded section 54 of the fixing column 50.

The torsion spring 60 includes a first extending segment 61 and a second extending segment 62 opposite to the first extending segment 61, wherein the first extending segment 61 retains in a recess 121 of the second orifice 12 and one of the two troughs 24, and the second extending segment 62 engages in the other of the two troughs 24, such that the torsion spring 60 abuts against the two retaining sets 21 obliquely.

The engagement block 30 further includes two shoulders 31 facing the connection seat 20, the connection seat 20 includes a plurality of protrusions 25 facing and mating with the two shoulders 31 so as to limit a rotation of the connection seat 20 and the two retaining sets 21 within a predetermined range in the frame 10, thus connecting the bicycle pedal 1 and fixing the two retaining sets 21 easily.

The fitting sleeve 40 accommodates a self-lubricating bushing 41 so that the fixing column 50 inserts into the fitting sleeve 40 and the self-lubricating bushing 41.

The second orifice 12 of the frame 10 and the through hole 22 of the connection seat 20 house the locking element 70, a stop disc 71, and a screw 72.

The locking element 70 includes a threaded aperture 701, and the stop disc 71 has an opening 711 accommodating the screw 72, and between the stop disc 71 and the locking element 70 is defined the torsion spring 60, wherein the screw 72 screws with the threaded aperture 701 of the locking element 70.

Figure 7:
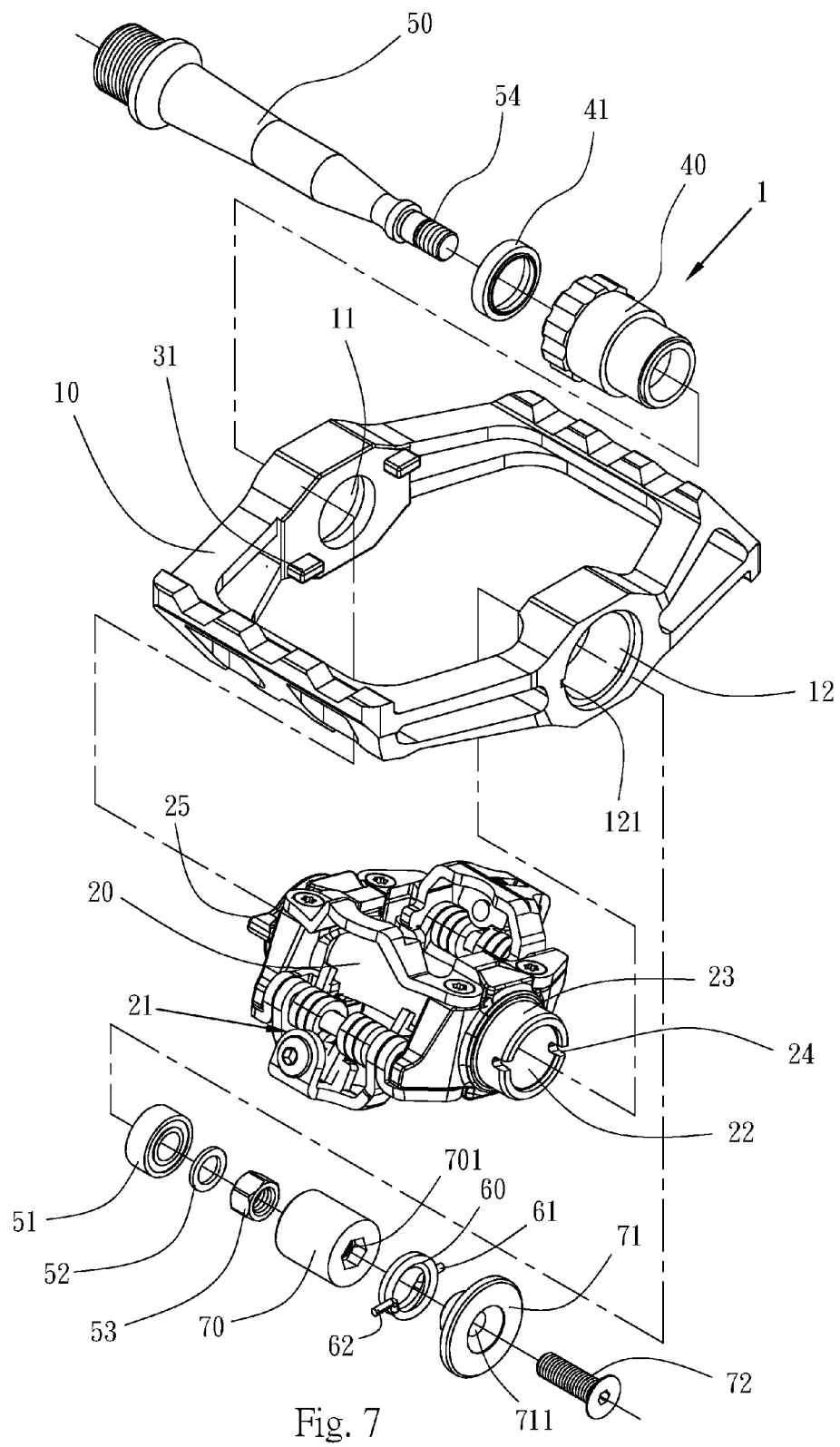
FIG. 7 is a perspective view showing the exploded components of a bicycle pedal according to a second embodiment of the present invention.
Figure 8:
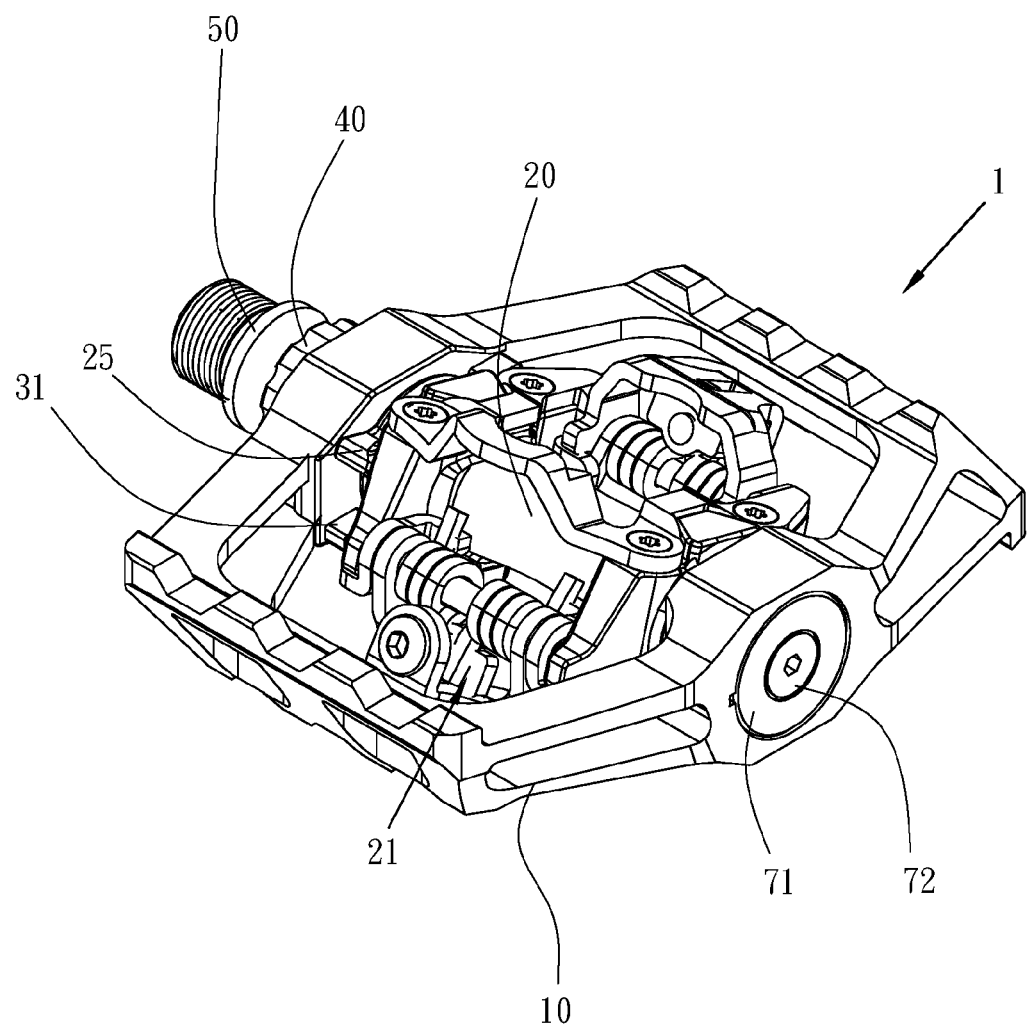
FIG. 8 is a perspective view showing the assembly of the bicycle pedal according to the second embodiment of the present invention.
Figure 9:
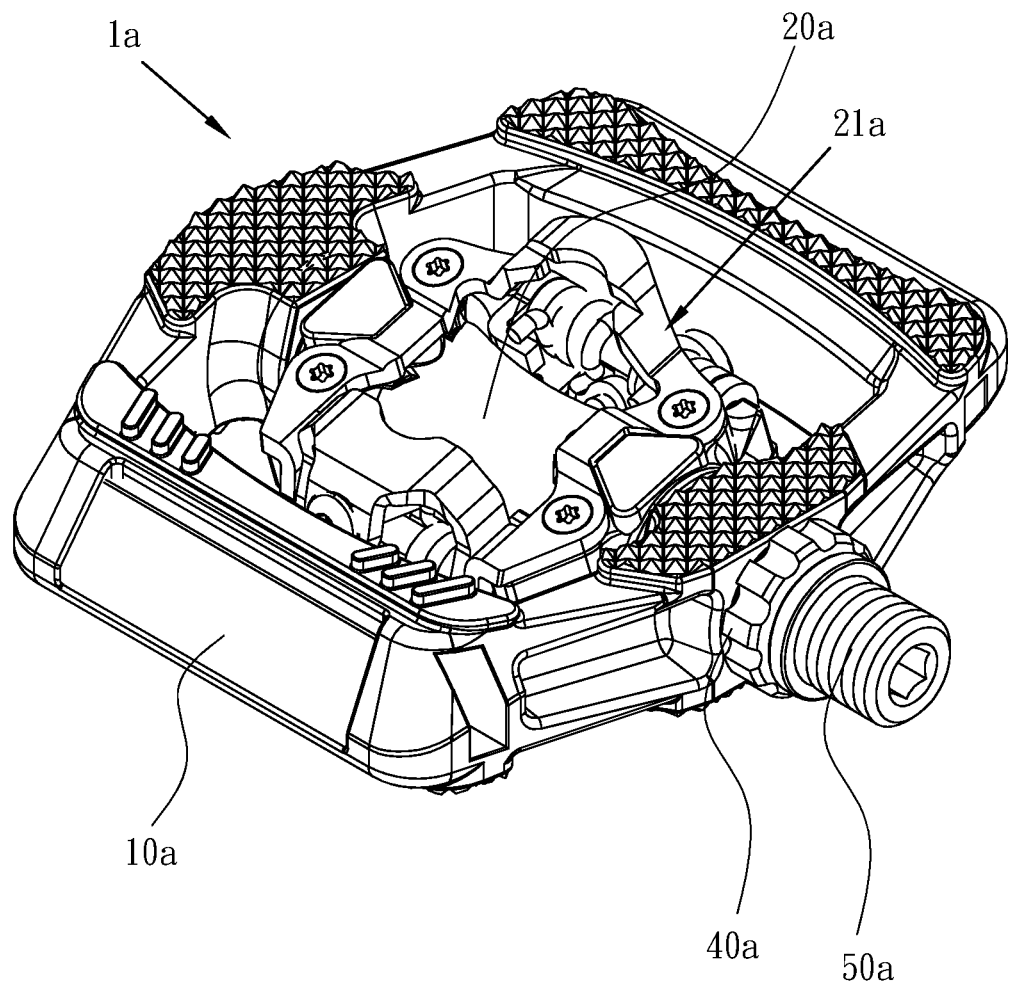
FIG. 9 is a perspective view showing the assembly of a bicycle pedal according to a third embodiment of the present invention.
Figure 10:
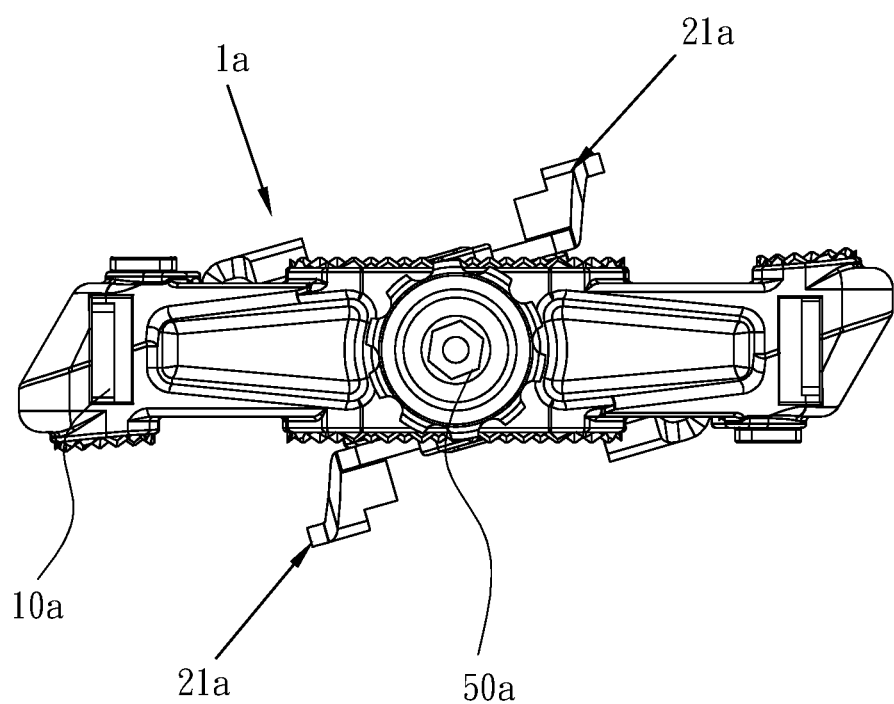
FIG. 10 is a side plane view showing the application of the bicycle pedal according to the third embodiment of the present invention.
Figure 11:
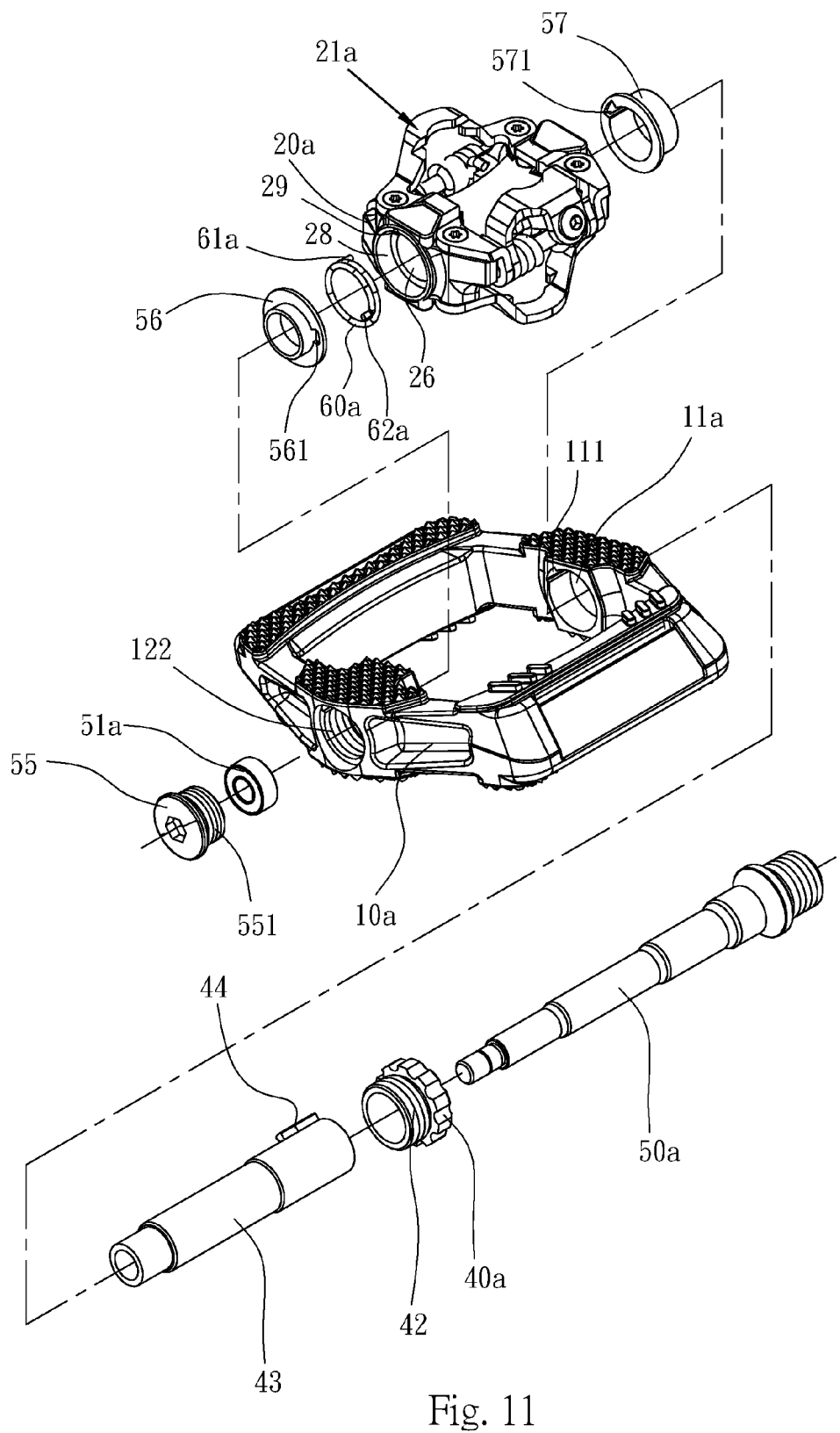
FIG. 11 is a perspective view showing the exploded components of the bicycle pedal according to the third embodiment of the present invention.
Figure 12:
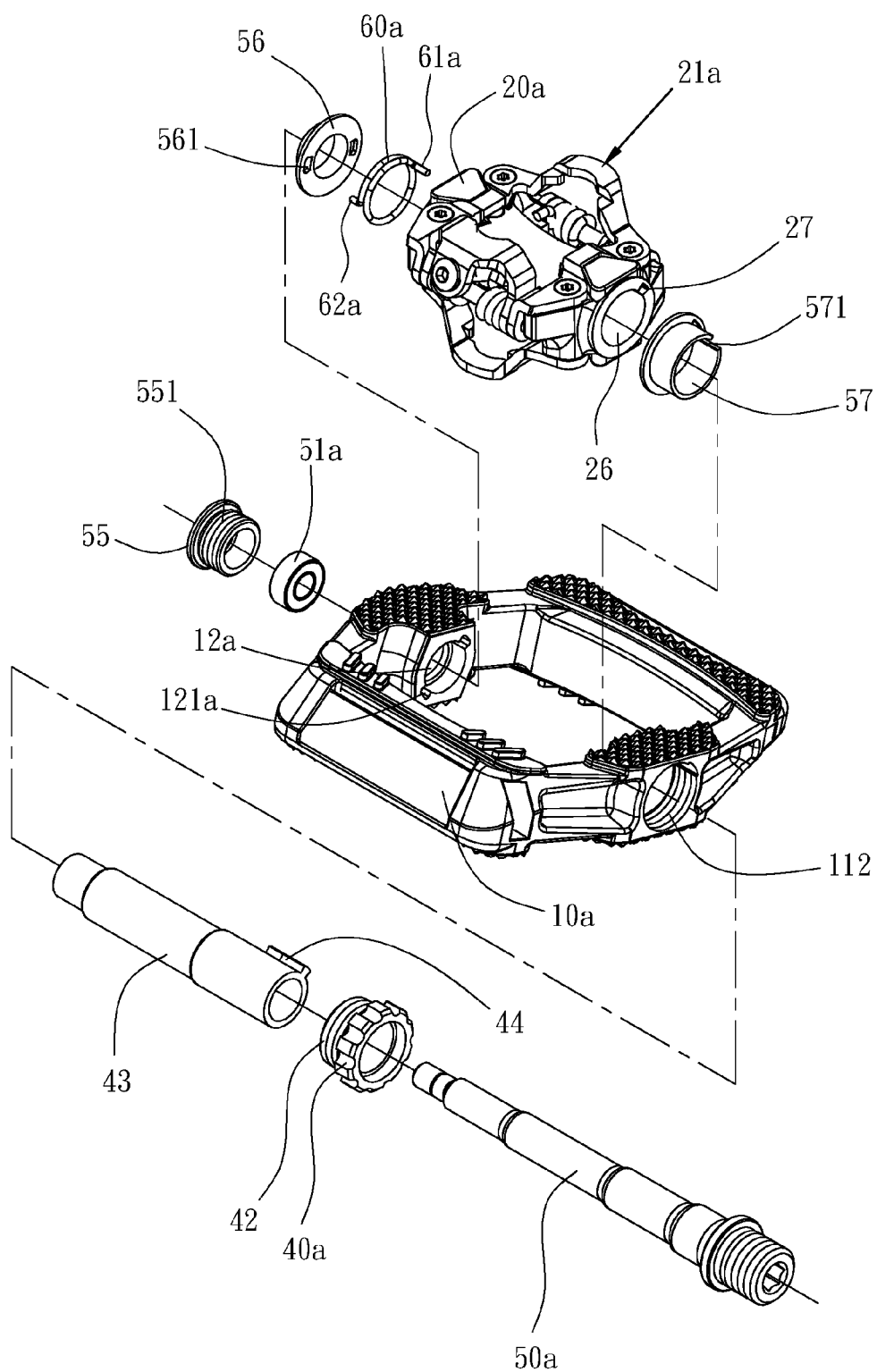
FIG. 12 is another perspective view showing the exploded components of the bicycle pedal according to the third embodiment of the present invention.
Figure 13:
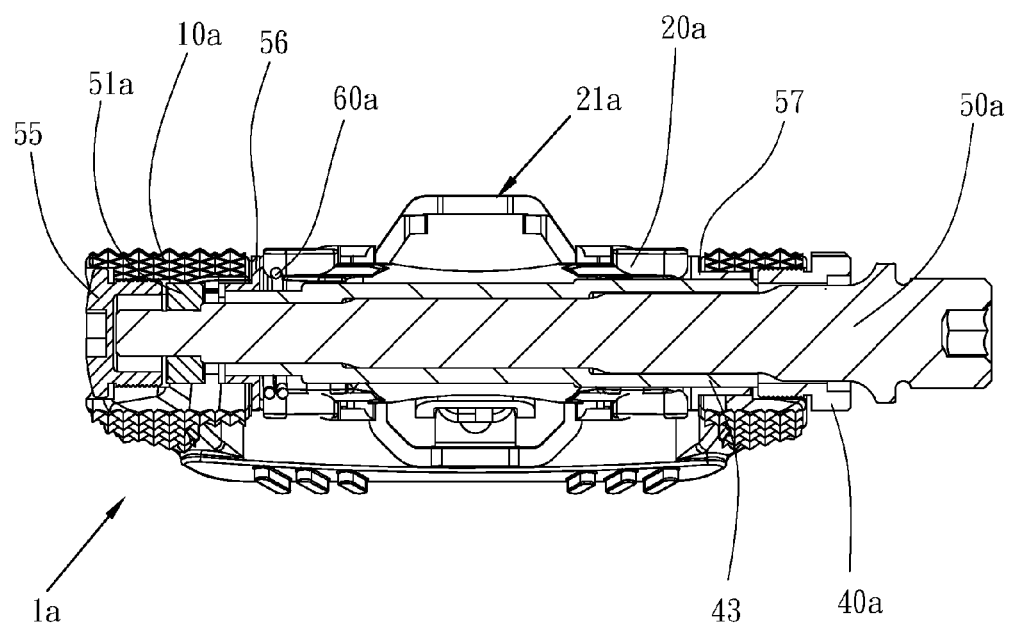
FIG. 13 is a cross sectional view showing the assembly of the bicycle pedal according to the third embodiment of the present invention.
Figure 14:
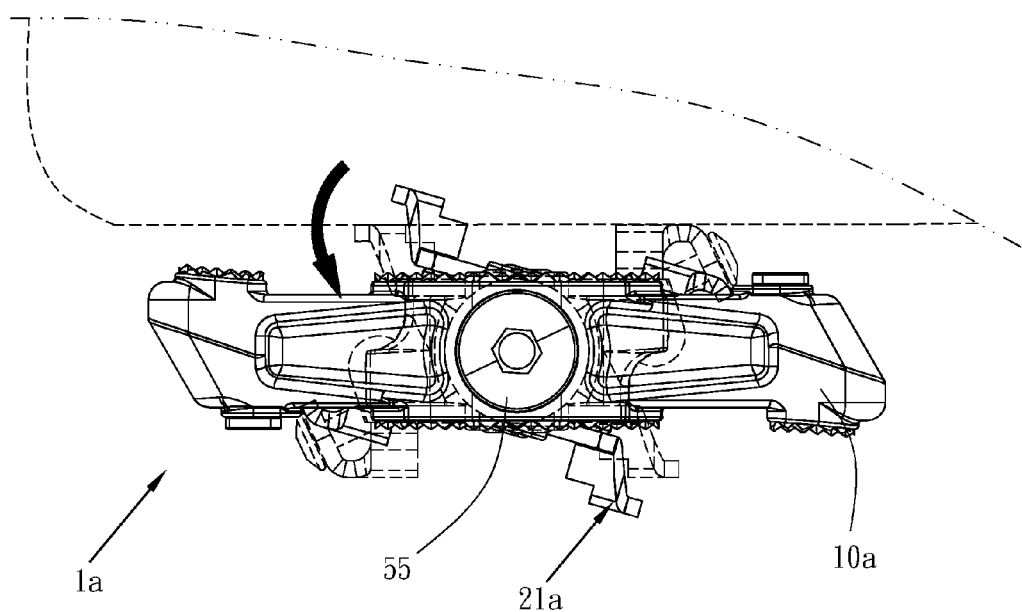
FIG. 14 is a side plane view showing the application of the bicycle pedal according to the third embodiment of the present invention.

Referring to FIGS. 7 and 8, a bicycle pedal according to a second embodiment of the present invention comprises: a frame 10, a connection seat 20, a fitting sleeve 40, a fixing column 50, a torsion spring 60, and a locking element 70.

The frame 10 includes a first orifice 11 defined on a first outer side of the frame 10, a second orifice 12 defined on a second outer side of the frame 10 opposite to the first orifice 11, and two shoulders 31 formed on an inner wall of the frame 10 adjacent to the first orifice 11.

The connection seat 20 includes two retaining sets 21 which are arranged on two end surfaces of the connection seat 20, respectively, a through hole 22 defined in the connection seat 20, a circular tube 23 formed on one side surface of the connection seat 20 and accommodated in the second orifice 12 of the frame 10, and two troughs 24 formed on an outer end of the circular tube 23. Furthermore, the connection seat 20 is fixed in the frame 10.

The fitting sleeve 40 is fitted with the first orifice 11 of the frame 10. The fixing column 50 is inserted through the fitting sleeve 40, the through hole 22 of the connection seat 20 and the second orifice 12 of the frame 10, wherein the fixing column 50 is in connection with a bearing 51 and a washer 52 and is screwed with a screw nut 53 by using a threaded section 54 thereof.

The torsion spring 60 includes a first extending segment 61 and a second extending segment 62 opposite to the first extending segment 61, wherein the first extending segment 61 retains in a recess 121 of the second orifice 12 and one of the two troughs 24, and the second extending segment 62 engages in the other of the two troughs 24, such that the torsion spring 60 abuts against the two retaining sets 21 obliquely.

The connection seat 20 further includes a plurality of protrusions 25 facing and mating with the two shoulders 31 so as to limit a rotation of the connection seat 20 and the two retaining sets 21 within a predetermined range in the frame 10, thus connecting the bicycle pedal 1 and fixing the two retaining sets 21 easily.

The fitting sleeve 40 accommodates a self-lubricating bushing 41 so that the fixing column 50 inserts into the fitting sleeve 40 and the self-lubricating bushing 41.

The second orifice 12 of the frame 10 and the through hole 22 of the connection seat 20 house the locking element 70, a stop disc 71, and a screw 72.

The locking element 70 includes a threaded aperture 701, and the stop disc 71 has an opening 711 accommodating the screw 72, and between the stop disc 71 and the locking element 70 is defined the torsion spring 60, wherein the screw 72 screws with the threaded aperture 701 of the locking element 70.

With reference to FIGS. 9 to 14, a bicycle pedal according to a third embodiment of the present invention comprises: a frame 10a, a connection seat 20a, a coupling post 40a, a torsion spring 60a, a fixing column 50a.

The frame 10a includes a first orifice 11a defined on a first outer side of the frame 10a, a second orifice 12a defined on a second outer side of the frame 10a opposite to the first orifice 11a, and a trench 111 formed in the first orifice 11a, wherein the frame 10a further includes two notches 121a arranged on an inner wall thereof and communicating with the second orifice 12a.

The connection seat 20a includes two retaining sets 21a which are arranged on two end surfaces of the connection seat 20a, respectively, a through hole 26 defined in the connection seat 20a, a cutout 27 adjacent to the through hole 26, a stepped indentation 28 opposite to the cutout 27, and a receiving hole 29 defined on an eccentric position of the stepped indentation 28.

A coupling post 43 includes a locking rib 44 arranged on an outer wall thereof.

The torsion spring 60a includes a first extending segment 61a and a second extending segment 62a opposite to the first extending segment 61a, wherein the first extending segment 61a retains in the receiving hole 29 of the second orifice 12a and one of the two notches 121a, and the second extending segment 62a engages in the other of the two notches 121a, such that the connection seat 20a rotates to a predetermined angle and is accommodated in the frame 10a so that the through hole 26 aligns with the first orifice 11a and the second through orifice 12a, the coupling post 43 inserts into the first orifice 11a of the frame 10a and the through hole 26 of the connection seat 20a, and the locking rib 44 retains in the trench 111 of the frame 10a and the cutout 27 of the connection seat 20a, such that a rotatable angle of the connection seat 20a is limited by the trench 111.

The fixing column 50a is inserted through the fitting sleeve 40a, the first orifice 11a of the frame 10a, the coupling post 43, and the second orifice 12a of the frame 10a so as to connect with a bearing 51a and is locked by a retaining spring or is screwed with a screw nut 53. The second orifice 12a of the frame 10a has an inner threaded portion 122 engaging with an outer threaded portion 551 of a cap 55.

The fitting sleeve 40a has threads 42 screwing with the inner threaded portion 122 of the first orifice 11a of the frame 10a, and the torsion spring 60a pushes the connection seat 20a and the two retaining sets 21a to rotate.

The cutout 27 of the connection seat 20a retains with the locking rib 44 of the coupling post 43, and the locking rib 44 engages in the trench 111 of the frame 10a, hence the two retaining seats 21a of the connection seat 20a rotates within a predetermined range in the frame 10a, thus connecting the bicycle pedal 1a and fixing the two retaining sets 21a easily. Preferably, the bicycle pedal 1a is assembled easily and quickly by way of the coupling post 43 and the locking rib 44.

Between the torsion spring 60a and the second orifice 12a of the frame 10a is defined a buffer ring 56 which aligns with the two notches 121a of the second orifice 12a of the frame 10a, and the buffer ring 56 has two pores 561 defined thereon and corresponding to the two notches 121a of the second orifice 12a of the frame 10a.

Between the connection seat 20a and the first orifice 11a of the frame 10a is defined a bushing 57 which aligns with the trench 111 of the first orifice 11a of the frame 10a, and the bushing 57 has a slit 571 formed thereon.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A bicycle pedal comprising:
a frame including a first orifice defined on a first outer side of the frame, a second orifice defined on a second outer side of the frame opposite to the first orifice, and a trench formed on an inner wall of the frame adjacent to the first orifice;
a connection seat fixed in the frame and including two retaining sets which are arranged on two end surfaces of the connection seat, respectively, a through hole defined in the connection seat, a circular tube formed on one side surface of the connection seat and accommodated in the second orifice of the frame, and two troughs formed on an outer end of the circular tube;
an engagement block engaged in the trench of the frame;
a fitting sleeve fitted into the first orifice of the frame;
a fixing column inserted through the fitting sleeve, the through hole of the connection seat, and the second orifice of the frame, wherein the fixing column is in connection with a bearing and a washer and is positionally fixed by a screw nut by using a threaded section of the fixing column; and
a torsion spring including a first extending segment and a second extending segment opposite to the first extending segment, wherein the first extending segment is retained in a recess of the second orifice and one of the two troughs, and the second extending segment engages in the other of the two troughs, such that the torsion spring abuts against the two retaining sets obliquely;
wherein the engagement block further includes two shoulders facing the connection seat, the connection seat includes a plurality of protrusions facing and mating with the two shoulders so as to limit a rotation of the connection seat and the two retaining sets within a predetermined range in the frame.

2. The bicycle pedal as claimed in claim 1, wherein the fitting sleeve accommodates a self-lubricating bushing so that the fixing column is inserted into the fitting sleeve and the self-lubricating bushing.

3. The bicycle pedal as claimed in claim 1, wherein the second orifice of the frame and the through hole of the connection seat house a locking element, a stop disc, and a screw; wherein the locking element includes a threaded aperture, and the stop disc has an opening accommodating the screw, and the torsion spring is located between the stop disc and the locking element, wherein the screw threads into the threaded aperture of the locking element.

4. A bicycle pedal comprising:
a frame including a first orifice defined on a first outer side of the frame, a second orifice defined on a second outer side of the frame opposite to the first orifice, and two shoulders formed on an inner wall of the frame adjacent to the first orifice;
a connection seat fixed in the frame and including two retaining sets which are arranged on two end surfaces of the connection seat, respectively, a through hole defined in the connection seat, a circular tube formed on one side surface of the connection seat and accommodated in the second orifice of the frame, and two troughs formed on an outer end of the circular tube;
a fitting sleeve fitted into the first orifice of the frame;
a fixing column inserted through the fitting sleeve, the through hole of the connection seat, and the second orifice of the frame, wherein the fixing column is in connection with a bearing and a washer and is positionally fixed by a screw nut by using a threaded section of the fixing column; and
a torsion spring including a first extending segment and a second extending segment opposite to the first extending segment, wherein the first extending segment is retained in a recess of the second orifice and one of the two troughs, and the second extending segment engages in the other of the two troughs, such that the torsion spring abuts against the two retaining sets obliquely.

5. The bicycle pedal as claimed in claim 4, wherein the fitting sleeve accommodates a self-lubricating bushing so that the fixing column is inserted into the fitting sleeve and the self-lubricating bushing.

6. The bicycle pedal as claimed in claim 4, wherein the second orifice of the frame and the through hole of the connection seat house a locking element, a stop disc, and a screw; wherein the locking element includes a threaded aperture, and the stop disc has an opening accommodating the screw, and the torsion spring is located between the stop disc and the locking element, wherein the screw threads into the threaded aperture of the locking element.

7. A bicycle pedal comprising:
a frame including a first orifice defined on a first outer side of the frame, a second orifice defined on a second outer side of the frame opposite to the first orifice, and a trench formed in the first orifice, wherein the frame further includes two notches arranged on an inner wall thereof and connecting with the second orifice;
a connection seat including two retaining sets which are arranged on two end surfaces of the connection seat, respectively, a through hole defined in the connection seat, a cutout adjacent to the through hole, a stepped indentation opposite to the cutout, and a receiving hole defined on an eccentric position of the stepped indentation;
a coupling post including a locking rib arranged on an outer wall thereof;
a torsion spring including a first extending segment and a second extending segment opposite to the first extending segment, wherein the first extending segment is retained in a recess of the second orifice and one of the two notches, and the second extending segment engages in the other of the two notches, such that the connection seat rotates to a predetermined angle and is accommodated in the frame so that the through hole aligns with the first orifice and the second orifice, the coupling post is inserted into the first orifice of the frame and the through hole of the connection seat, and the locking rib retains in the trench of the frame and the cutout of the connection seat, such that a rotatable angle of the connection seat is limited by the trench; and a fixing column inserted through a fitting sleeve, the first orifice of the frame, the coupling post, and the second orifice of the frame so as to connect with a bearing and is locked by a retaining spring or is screwed with a screw nut;

wherein the second orifice of the frame has an inner threaded portion fastened with an outer threaded portion of a cap, and the fitting sleeve has threads directly engaged with the inner threaded portion of the first orifice of the frame, and the torsion spring pushes the connection seat and the two retaining sets to rotate.

8. The bicycle pedal as claimed in claim 7, wherein between the torsion spring and the second orifice of the frame is defined a buffer ring which aligns with the two notches of the second orifice of the frame, and the buffer ring has two pores defined thereon and corresponding to the two notches of the second orifice of the frame.

9. The bicycle pedal as claimed in claim 7, wherein between the connection seat and the first orifice of the frame is defined a bushing which aligns with the trench of the first orifice of the frame, and the bushing has a slit formed thereon.

\* \* \* \* \*